United States Patent
Tsirkin et al.

(10) Patent No.: US 10,552,080 B2
(45) Date of Patent: Feb. 4, 2020

(54) MULTI-TARGET POST-COPY GUEST MIGRATION

(71) Applicant: Red Hat, Inc., Raleigh, NC (US)

(72) Inventors: Michael Tsirkin, Lexington, MA (US); David Alan Gilbert, Manchester (GB)

(73) Assignee: Red Hat, Inc., Raleigh, NC (US)

( * ) Notice: Subject to any disclaimer, the term of this patent is extended or adjusted under 35 U.S.C. 154(b) by 223 days.

(21) Appl. No.: 15/663,417

(22) Filed: Jul. 28, 2017

(65) Prior Publication Data

US 2019/0034112 A1 Jan. 31, 2019

(51) Int. Cl.

| | |
|---|---|
| *G06F 9/46* | (2006.01) |
| *G06F 3/06* | (2006.01) |
| *G06F 12/1009* | (2016.01) |
| *G06F 9/48* | (2006.01) |
| *G06F 9/4401* | (2018.01) |
| *G06F 9/455* | (2018.01) |

(52) U.S. Cl.
CPC ............ *G06F 3/0647* (2013.01); *G06F 3/067* (2013.01); *G06F 3/0631* (2013.01); *G06F 9/4411* (2013.01); *G06F 9/45558* (2013.01); *G06F 9/4856* (2013.01); *G06F 12/1009* (2013.01); *G06F 2009/45579* (2013.01); *G06F 2009/45595* (2013.01); *G06F 2212/152* (2013.01); *G06F 2212/154* (2013.01)

(58) Field of Classification Search
CPC ..... G06F 3/0647; G06F 3/0631; G06F 9/4411
See application file for complete search history.

(56) References Cited

U.S. PATENT DOCUMENTS

| | | | |
|---|---|---|---|
| 8,533,713 B2 | 9/2013 | Dong | |
| 8,705,513 B2 | 4/2014 | Van Der Merwe et al. | |
| 9,565,038 B2 | 2/2017 | Addanki et al. | |
| 9,621,668 B2 | 4/2017 | Kamath et al. | |
| 9,626,212 B2 | 4/2017 | Beveridge et al. | |
| 2010/0257269 A1* | 10/2010 | Clark | G06F 9/4856 709/226 |

(Continued)

OTHER PUBLICATIONS

Post-Copy Live Migration of Virtual Machines; Michael R. Hines, Umesh Deshpande, Kartik Gopalan; Computer Science, Binghamton University (SUNY)I Mar. 2009 (13 pages).

(Continued)

*Primary Examiner* — Camquy Truong
(74) *Attorney, Agent, or Firm* — K&L Gates LLP (57) ABSTRACT

Multi-target post-copy guest migration is disclosed. For example, first, second, and third host nodes are associated with respective first, second, and third memories and respective first, second, and third isolated guest managers. An isolated guest, previously migrated from the first host node, executes on the second host node with a first memory page in the first memory and second and third memory pages in the second memory. The isolated guest is requested to migrate to the third host node. The isolated guest executes on the third host node after the third memory page is migrated. The isolated guest requests the first memory page. The third memory is determined to lack the first memory page, and in response, the first and second isolated guest managers are notified that the first memory page is required by the third host resulting in the first memory page being sent to the third host.

20 Claims, 6 Drawing Sheets

(56) References Cited

U.S. PATENT DOCUMENTS

2014/0188932 A1* 7/2014 Kalita ............... G06Q 10/10
707/770
2017/0024246 A1 1/2017 Gopalan

OTHER PUBLICATIONS

Scalable Virtual Machine Deployment Using VM Images Caches; Kaveh Razavi, Thilo Kielmann, Dept. of Computer Science; VU University Amsterdam, The Netherlands; Nov. 17-21, 2013 (11 pages).
SnowFlock: Rapid Virtual Machine Cloning for Cloud Computing; H. Andres Lagar-Cavilla, Joseph A. Whitney, Adi Scannell, Philip Patchin, Stephen M. Rumble; Published by Guset User, Feb. 1, 2017; pp. 1-8.

* cited by examiner

MULTI-TARGET POST-COPY GUEST MIGRATION

BACKGROUND

The present disclosure generally relates to memory management of isolated guests such as virtual machines. In computer systems, it may be advantageous to scale application deployments by using virtualization in the form of isolated guests such as virtual machines and containers that may be used for creating hosting environments for running application programs. Typically, isolated guests such as containers and virtual machines may be launched to more efficiently utilize computing capacity from deployed physical hardware, as well as to increase the flexibility of such deployed physical hardware. Isolated guests may allow a programmer to quickly scale the deployment of applications to the volume of traffic requesting the applications and may be deployed in a variety of hardware environments. There may be economies of scale in deploying hardware in a large scale. During the deployment of an isolated guest such as a virtual machine or a container, there may be requirements for moving the guest from one host to another for performance reasons such as processor, memory, or network utilization optimizations. Migrations may also be performed for reasons such as changing network conditions, security requirements, or maintenance requirements. The present disclosure provides improved systems and methods for managing memory in virtualized environments.

SUMMARY

The present disclosure provides a new and innovative system, methods and apparatus for multi-target post-copy guest migration. In an example, a plurality of host nodes is associated with a plurality of memories and a plurality of isolated guest managers including first, second, and third host nodes associated with respective first, second, and third memories and respective first, second, and third isolated guest managers. An isolated guest, previously migrated from the first host node, executes on the second host node with a first memory page in the first memory and second and third memory pages in the second memory. One or more processors execute to receive a request to migrate the isolated guest to the third host node. The third memory page is migrated to the third host node and the isolated guest begins executing after the third memory page is migrated. The isolated guest requests the first memory page. The third isolated guest manager determines that the third memory lacks the first memory page. In response to determining that the third memory lacks the first memory page, the first isolated guest manager and the second isolated guest manager are notified that the first memory page is required by the third host. The first isolated guest manager sends the first memory page to the third host.

Additional features and advantages of the disclosed method and apparatus are described in, and will be apparent from, the following Detailed Description and the Figures.

DETAILED DESCRIPTION OF EXAMPLE EMBODIMENTS

Typically, in computer systems utilizing isolated guests, virtual machines and/or containers are used. In an example, a virtual machine ("VM") may be a robust simulation of an actual physical computer system utilizing a hypervisor (e.g., Red Hat® KVM and Red Hat® KVM hypervisor) to allocate physical resources to the virtual machine. In some examples, a container based virtualization system such as Red Hat® OpenShift® or Docker® may be advantageous as container based virtualization systems may be lighter weight than systems using virtual machines with hypervisors. In the case of containers, oftentimes a container will be hosted on a physical host or virtual machine that already has an operating system ("OS") (e.g., Red Hat Enterprise Linux®) executing, and the container may be hosted on the operating system of the physical host or VM. Virtualization may allow parallel deployment of computing power to more efficiently utilize computing power for a given set of physical hardware.

Due to economies of scale, containers often tend to be more advantageous in large scale hardware deployments where the relatively fast ramp-up time of containers allows for more flexibility for many different types of applications to share computing time on the same physical hardware, for example, in a private or multi-tenant cloud environment. In some examples, where containers from a homogenous source are deployed, it may be advantageous to deploy containers directly on physical hosts. In a multi-tenant cloud, it may be advantageous to deploy containers and groups of containers within virtual machines as the hosting service may not typically be able to predict dependencies for the containers such as shared operating systems, and therefore, using virtual machines (e.g., with Red Hat Virtualization®) adds flexibility for deploying containers from a variety of sources on the same physical host. In an example, hosting containers directly on physical servers may yield further efficiencies, but may restrict the containers executing on the physical servers to containers that are compatible with the physical server's host operating system. In comparison, hosting containers inside VMs may enable the hosting of containers with different architectures on the same physical server. In an example, physical and/or virtual host nodes may each host dozens or hundreds of containers, each of which may independently execute tasks. In an example, an isolated guest such as a VM or container may be required to be migrated from one host to another, whether the host is physical or virtual. For example, a given host may be overloaded from a compute capacity perspective and some of its isolated guests may be migrated to a less busy host, or related isolated guests may be migrated to a shared host for network latency efficiencies when a host with sufficient capacity is located.

Migrating isolated guests while they execute raise numerous potential problems relating to minimizing the downtime of the isolated guest during the migration. A guest typically requires a significant portion of its memory pages to be located on a given host in order to execute properly. Therefore, during migration, a threshold portion of the guest's current execution state in the form of memory pages may typically be transferred to a new host prior to execution of the guest beginning on the new host. However, the guest's state is constantly changing as it is executing, therefore presenting a moving target for transmission and migration. A basic migration strategy may suspend execution of the guest until the memory pages associated with the guest are transferred to a new host, but this type of transfer may result in a prolonged downtime for the guest, ranging from a minute to upwards of an hour. Therefore, typical migration strategies attempt to migrate guests while they are executing.

Typically migration strategies may be divided into pre-copy migration, where memory pages comprising the current state of a guest are migrated to a new host while the host continues execution on the old host, and post-copy migration, where the guest is launched on the new host and the state is transferred on an as-needed basis from the old host, or a combination of pre-copy and post-copy migration. On one hand, a typical disadvantage of pre-copy migration is that pre-copy migration chases a moving target, and the same memory page may require transmission multiple times as it is updated during the transmission phase. In a sufficiently quickly executing system, the updates to the state of the guest on the old host may well out-pace the transmission rate of the state to the new host. On the other hand, post-copy migration typically entails launching a new copy of a guest on a new host, with memory references to the existing execution state of the guest on its original host, for example, through migrating a page table. In an example, after the new copy of the guest is launched on the new host and begins executing, the old copy of the guest on the old host may be frozen to prevent additional changes to the memory state of the guest in preparation for migrating the memory pages upon request by the new guest. Post-copy migration may also typically result in page faults on the new host when a given page requested by the guest has yet to be transferred and the page must then be located and retrieved from a previous host. Therefore, pre-copy migration typically incurs a significant network load overhead, while post-copy migration typically incurs a significant overhead in the form of waiting time as pages are migrated and/or retrieved.

Combining pre-copy and post-copy migration may typically allow for avoiding significant pause time during the initial transfer of a threshold quantity of pages for the guest to be launched on the new host, while still reducing network load by allowing less used pages to be transferred only once when requested. However, where a given guest is migrated multiple times, a post-copy phase in a guest migration may incur significant latency as the ultimate host of a given memory page is tracked down and the memory page is transmitted up the chain of hosts. For example, if a guest is migrated from a first host to a second host to a third host, and a first memory page was never migrated off of the first host, if the guest requests the first memory page while on the third host, the third host may contact the second host, which may contact the first host, and the first host may then respond by sending the first page to the second host, which may then be forwarded to the third host, introducing significant network inefficiencies as well as processing overhead on each former host to determine whether the former host has the given memory page. As migration chains get longer, an inheritance model for post-copy migration chains begins resulting in rapidly increasing latencies for obtaining missing pages, potentially resulting in timeouts and execution errors for the guest. A given host may also be unable to exit the chain of custody even if each page on the host has been transmitted as long as the host may be required to pass a request further up the chain. In an example, an operation that would take less than one ms with a locally stored memory page may take 15 ms if the memory page is retrieved from one host up the chain of previous hosts, but may well take up to one hundred ms if the same memory page is retrieved from a host seven or eight hosts up the chain of previous hosts.

The present disclosure aims to address the above discussed issues including the latency and processing overhead issues presented by pre-copy and post-copy migration with multi-target post-copy guest migration. In an example, each host that has previously hosted a certain guest may register to a group associated with that guest. The guest may be migrated initially through a combination of pre-copy and post-copy methods, but once the guest is at its destination host, if a memory page is requested that triggers a page fault due to a lack of a local copy of the page, the isolated guest manager (e.g., hypervisor, container engine) on the destination host may notify each other member of the group that the page is requested. In an example, each page associated with a guest is flagged as one of several states that may be mutually exclusive on each host that has previously hosted the guest, for example, by the isolated guest manager executing on each respective host. Such a flag may entail minimal overhead being tracked by single Boolean toggles, for example, representing a transferred state, an active state, and an absent state. In such an example, if a page is flagged in the transferred or absent states, the request from the destination host may be ignored, while the one host with the page copy flagged active may transmit the message. In an example, at the cost of a limited amount of network overhead from broadcasting each request and memory overhead for storing state information, significant network overhead and extraneous latency from requesting memory pages serially down a chain of previous hosts may be avoided resulting in significant average latency reductions in environments where multiple host moves are common. In an example, a multicast group may be advantageous for reducing network latency for requesting such pages. In an example, further efficiencies may be gained by aggressively transferring pages off of previous hosts, for example, based on age or quantity, so that older hosts or hosts with less active pages may be removed from the multicast group.

Figure 1:
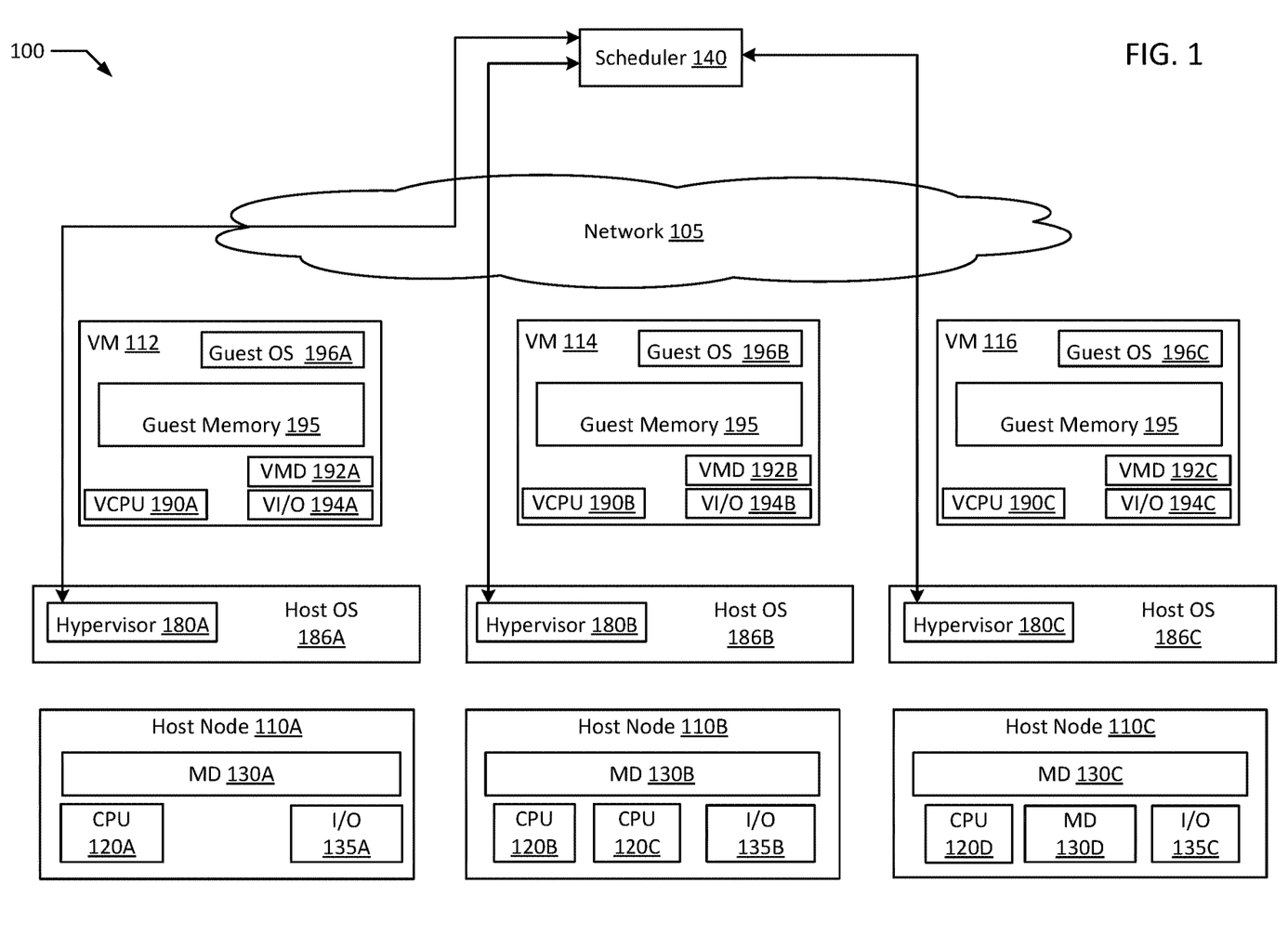
FIG. 1 is a block diagram of a multi-target post-copy guest migration system according to an example of the present disclosure.

FIG. 1 is a block diagram of a multi-target post-copy guest migration system according to an example of the present disclosure. The system 100 may include one or more interconnected hosts (e.g., host nodes 110A-C). Host nodes 110A-C may in turn include one or more physical processors (e.g., CPUs 120A-D) communicatively coupled to memory devices (e.g., memory devices 130A-D) and input/output devices (e.g., I/Os 135A-C). As used herein, physical processor or processors (e.g., CPUs 120A-D) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device (e.g., memory devices 130A-D) refers to a volatile or non-volatile memory device, such as RAM, ROM, EEPROM, or any other device capable of storing data. As discussed herein, an I/O device (e.g., I/O devices 135A-C) refers to devices capable of providing an interface between one or more processor pins and an external device, the operation of which is based on the processor inputting and/or outputting binary data. CPUs 120A-D may be interconnected with other CPUs using a variety of techniques, ranging from a point-to-point processor interconnect, to a system area network, such as an Ethernet-based network. Local connections within host node 110A, including the connections between a processor 120A and a memory device 130A and between a CPU 120A and an I/O device 135A may be provided by one or more local buses of suitable architecture, for example, peripheral component interconnect (PCI).

In an example, host nodes 110A-C may run one or more isolated guests, for example, VM 112, 114, and 116. In an example, host nodes 110A-C and/or VM 112, 114, and 116 may additionally host containers using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine (e.g., VM 112, 114, and 116). In addition, containers and/or VMs may further host other guests necessary to execute their configured roles. For example, VM 112 and/or a container hosted on VM 112 or host node 110A may further host a Java® Virtual Machine if execution of Java® code is necessary.

System 100 may run VM 112 by executing a software layer (e.g., hypervisor 180A) above the hardware and below VM 112, as schematically shown in FIG. 1A. In an example, the hypervisor 180 (e.g., Red Hat® KVM and Red Hat® KVM hypervisor) may be a component of a host operating system 186A executed by the system 100. In another example, the hypervisor 180A may be provided by an application running on the operating system 186A, or may run directly on the host node 110A without an operating system beneath it. The hypervisor 180A may virtualize the physical layer, including processors, memory, and I/O devices, and present this virtualization to VM 112 as devices, including virtual central processing units ("VCPU") 190A, virtual memory devices ("VMD") 192A, virtual input/output ("VI/O") devices 194A, and/or guest memories (e.g., guest memory 195A). In an example, a VM 112 may be a virtual machine and may execute a guest operating system 196A which may utilize the underlying VCPU 190A, VMD 192A, and VI/O 194A. In an example, a container may execute directly on host OS 186A without an intervening layer of virtualization. In another example, a container may execute on guest OS 196A. Processor virtualization may be implemented by the hypervisor 180 scheduling time slots on one or more physical processors 120A such that from the guest operating system's perspective those time slots are scheduled on a virtual processor 190A.

VM 112 may run on any type of dependent, independent, compatible, and/or incompatible applications on the underlying hardware and host operating system 186A. In an example, a container running on VM 112 may be dependent on the underlying hardware and/or host operating system 186A. In another example, a container running on VM 112 may be independent of the underlying hardware and/or host operating system 186A. In an example, a container running on VM 112 may be compatible with the underlying hardware and/or host operating system 186A. Additionally, a container running on VM 112 may be incompatible with the underlying hardware and/or OS. The hypervisor 180A may manage memory for the host operating system 186A as well as memory allocated to the VM 112 and guest operating system 196A such as guest memory 195A is provided to guest OS 196A.

In an example, network 105 may be any form of suitable network for allowing communications between computing devices, for example, a public network (e.g., the Internet), a private network (e.g., a local area network (LAN) or wide area network (WAN)), or a combination thereof. In an example, scheduler 140 may be any suitable scheduler for deploying virtualized guests such as virtual machines (e.g., Red Hat® Virtualization) and containers (e.g., Red Hat® Open Shift). In an example, scheduler 140 may direct the deployment and/or migration of isolated guests (e.g., VMs 112, 114, 116, and respective nested containers and VMs). In an example, each of VMs 112, 114, and 116 may be associated with a separate respective multicast group.

In an example, host node 110B, including all of its related sub-components (e.g., CPUs 120B-C, I/O 135B, memory device 130B, host OS 186B, hypervisor 180B, VM 114, VCPU 190B, VMD 192B, VI/O 194B, guest memory 195B, guest OS 196B) may be substantially similar to the respective components of host node 110A. In an example, host node 110C, including all of its related sub-components (e.g., CPUs 120D, I/O 135C, memory devices 130C-D, host OS 186C, hypervisor 180C, VM 116, VCPU 190C, VMD 192C, VI/O 194C, guest memory 195C, guest OS 196C) may be also be substantially similar to the respective components of host node 110A.

Figure 2A:
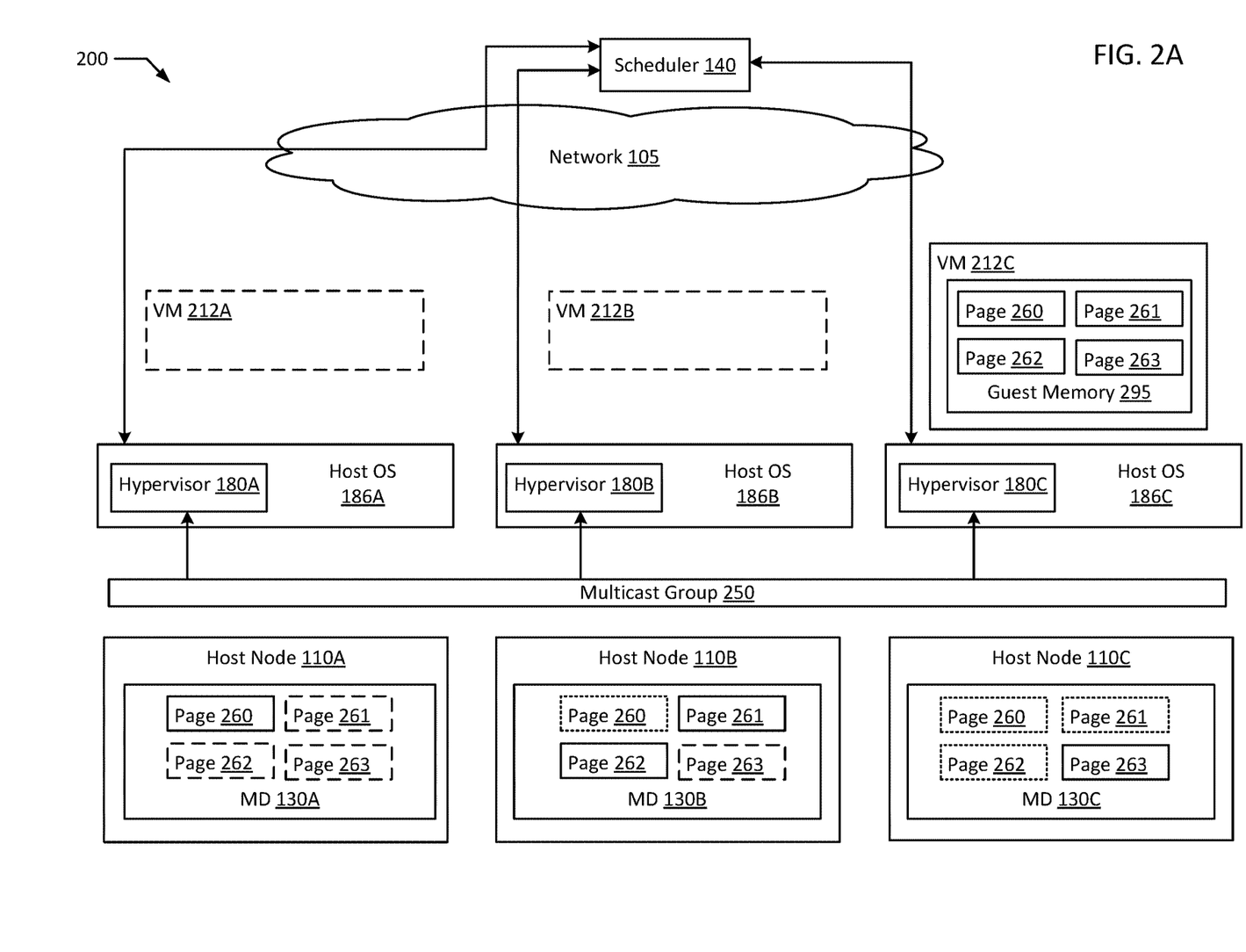
FIG. 2A is a block diagram illustrating a migrated virtual machine in a multi-target post-copy guest migration according to an example of the present disclosure.

FIG. 2A is a block diagram illustrating a migrated virtual machine in a multi-target post-copy guest migration according to an example of the present disclosure. System 200 depicts a VM 212A substantially similar to VM 112 in transition being migrated from host node 110A to host node 110B then finally to host node 110C. In an example, scheduler 140 may instruct VM 212A, which includes at least four memory pages (e.g., pages 260-263) to be migrated first from host node 110A to host node 110B. In an example, when each host node (e.g., host nodes 110A-C) is selected to host the VM, the respective hypervisor (hypervisors 180A-C) of the host node (e.g., host nodes 110A-C) may join multicast group 250 associated with VMs 212A-C. In an example, VMs 212A-C may be the same VM migrated several times. In illustrated system 200, dashed lines (e.g., VMs 212A-B, pages 261-263 in memory device 130A, and page 263 in memory device 130B) may illustrate the source of completed migrations, solid lines (e.g., VM 212C, page 260 in memory device 130A, pages 261-262 in memory device 130B, and page 263 in memory device 130C) may illustrate currently active components, while dotted lines (e.g., page 260 in memory device 130B, and pages 260-262 in memory device 130C may depict components that have yet to be migrated. In an example, VM 212A may migrate page 263 from memory device 130A to memory device 130B and then VM 212A may be relaunched on host node 110B as VM 212B. In the example, pages 261-262 may later be transferred also to memory device 130B. A new request may then send page 263 to memory device 130C. In the example, VM 212C including guest memory 295 with virtual references to all of the pages of VM 212C (e.g., pages 260-263) may be launched on host node 110C after page 263 is transferred to memory device 130C. In example system 200, VMs 212A-B are therefore terminated, with VM 212C executing on host node 110C. In the example, if VM 212C requests pages 260-262, hypervisor 180C would notify multicast group 250 of the request, for example, after detecting a page fault due to any of pages 260-262 not having been transferred to memory device 130C. In an example, pages 260-262 are flagged as absent on host node 110C, while page 263 is flagged as active. In the example, page 260 is flagged as active, and pages 261-263 are flagged as transferred on host node 110A; page 260 is flagged as absent, pages 261-262 are flagged as active, and page 263 is flagged as transferred on host node 110B.

In an example, a state of a given page (e.g. pages 260-263) on a given host (e.g., host nodes 110A-C) may be stored by any suitable means. In an example, a few bits on each page (e.g. pages 260-263) in the memory may be reserved for storing state information, for example, along with other metadata associated with the page. In another example, an isolated guest manager (e.g., hypervisors 180A-C) may store states of memory pages managed by the isolated guest manager (e.g., pages 260-263) outside of the pages along with metadata associating the memory page to a given guest as part of the isolated guest manager's memory management tasks. In an example, a special storage (e.g., metadata) associated with a given isolated guest (e.g., VMs 212A-C) on each of host nodes 110A-C may store a state of each memory page of the VM (e.g., pages 260-263). In an example, state information for a page may be stored in the form of one or more Boolean values for minimal storage overhead. In the example, the state information may be quickly accessible by an isolated guest manager (e.g., hypervisors 180A-C). In an example, each page-state-host combination on may be stored as a page-state tuple associated in an appropriate storage on the host or isolated guest manager executing on the host. For example, hypervisor 180A may have a storage for page-state tuples for the state of each page of a given VM (e.g., VM 212A) that executed on host node 110A.

Figure 2B:
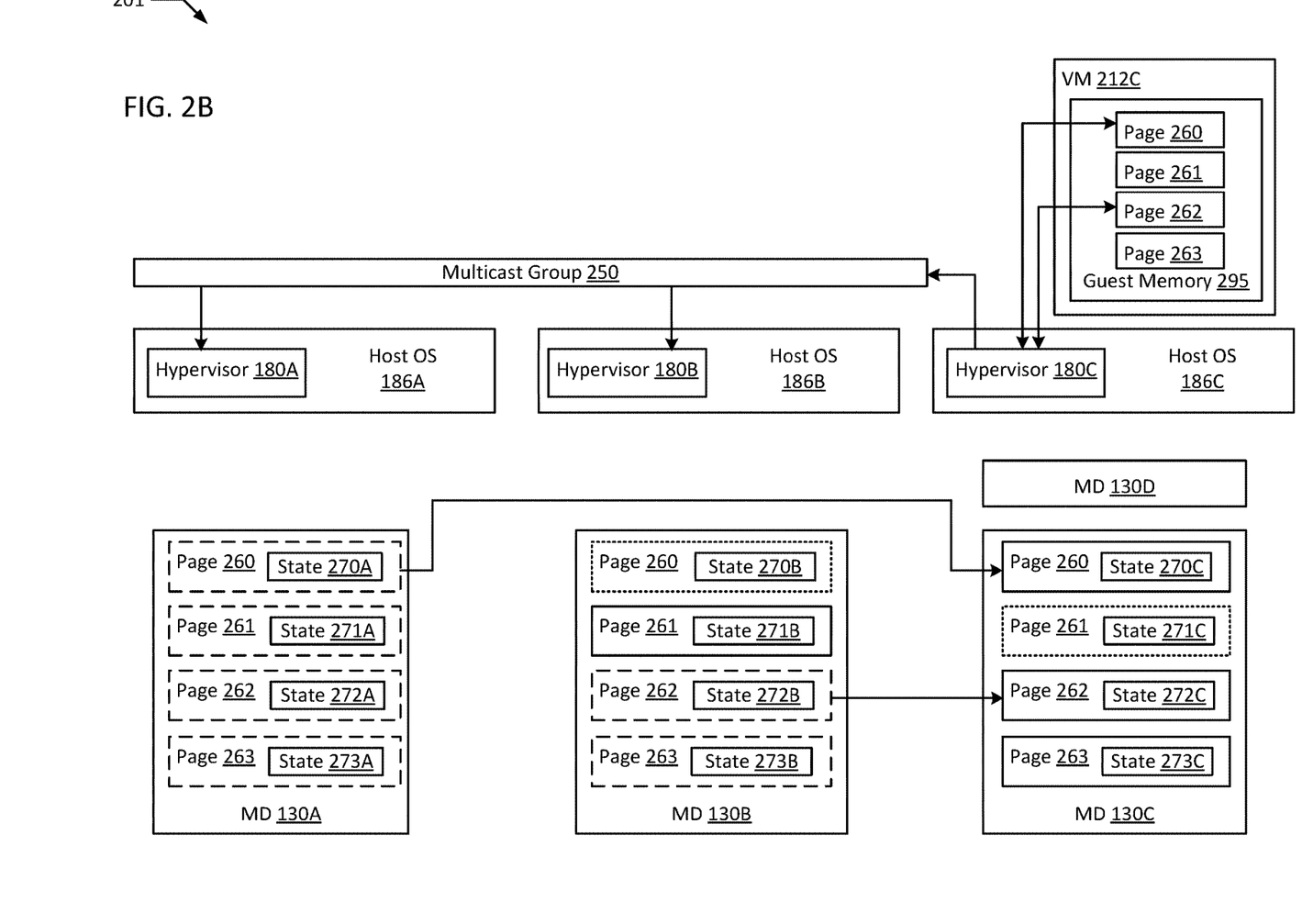
FIG. 2B is a block diagram illustrating memory page migrations in a multi-target post-copy guest migration according to an example of the present disclosure.

FIG. 2B is a block diagram illustrating memory page migrations in a multi-target post-copy guest migration according to an example of the present disclosure. In an example, illustrated system 201 depicts VM 212C from system 200 further executing and requesting pages 260 and 262. In an example, upon receiving a request for page 260, hypervisor 180C may attempt to retrieve page 260 from memory device 130C, and a page fault may result when hypervisor 180C determines that page 260 is not present in memory device 130C, causing hypervisor 180C to issue a request to multicast group 250 to retrieve page 260. In another example, hypervisor 180C may determine that a state 270C of page 260 on host node 110C indicates that page 260 has not yet been received by host node 110C (e.g., state 270C is set to the absent state), causing hypervisor 180C to issue a request to multicast group 250 to retrieve page 260. In an example, states 270A, 271A, 272A, and 273A may correspond to the state of pages 260-263 respectively on host node 110A; states 270B, 271B, 272B, and 273B may correspond to the state of pages 260-263 respectively on host node 110B; states 270C, 271C, 272C, and 273C may correspond to the state of pages 260-263 respectively on host node 110C. In an example, states 270A-C, 271A-C, 272A-C, and 272A-C may be retained in respective hypervisors 180A-C. In another example, states 270A-C, 271A-C, 272A-C, and 272A-C may be retained in memory device 130A, memory device 130B, and memory device 130C respectively (e.g., as one or more boolean flags).

In an example, multicast group 250 may forward a request from hypervisor 180C for page 260 to each member of multicast group 250 (e.g., hypervisors 180A-C). In an example, multicast group 250 may expand to include each new host (e.g., host nodes 110A-C) of a given guest (e.g., VMs 212A-C) and may contract to remove any hosts that have transferred all local memory pages of such guests (e.g., VMs 212A-C). In an example, multicast group 250 may exclude a sender (e.g., hypervisor 180C) from receiving its own request. In another example, hypervisor 180C may join multicast group 250 only after VM 212C begins migration to a fourth host node. In an example, hypervisor 180C may be copied on its own request. In the examples, hypervisor 180A queries state 270A of page 260 on memory device 130A, while hypervisor 180B queries state 270B of page 260 on memory device 130B. In an example, hypervisor 180A sends page 260 to host node 110C upon determining that state 270A indicates that page 260 on memory device 130A is the current executable copy of the page (e.g., based on state 270A being set to the active state). In an example, upon starting the transmission of page 260 to memory device 130C, state 270A is set to the transferred state. In another example, state 270A is only set to the transferred state upon receiving an acknowledgement from host node 110C that page 260 is successfully transferred. In an example, after transmitting page 260, each page-state combination on host node 110A associated with VM 212A, including states 270A, 271A, 272A, and 273A may all be set to the transferred state because all of pages 260-263 would then have been transferred, and removal of host node 110A and/or hypervisor 180A from multicast group 250 may be requested. In an example, hypervisor 180B determines that state 270B may indicate that page 260 was never received by hypervisor 180B (e.g., state 270B being set to the absent state). In the example, hypervisor 180B may ignore the request from hypervisor 180C for page 260, for example, based on state 270B. In another example, hypervisor 180B may respond to hypervisor 180C indicating that hypervisor 180B and host node 110B never received page 260.

In an example, a second request for page 262 by VM 212C results in a second page fault and a new retrieval request from hypervisor 180C to multicast group 250. In the example, hypervisor 180A may ignore the retrieval request, for example, based on state 272A being set to the transferred state. In the example, hypervisor 180B may determine that state 272B is set to the active state and may begin transferring page 262 to memory device 130C. In an example after transferring page 262 from memory device 130B to memory device 130C, hypervisor 180B may set state 272B to the transferred state. In illustrated example system 201, after the pages 260 and 262 are transferred to memory device 130C, the corresponding states to pages 260-263 on memory device 130A (e.g., states 270A, 271A, 272A, and 273A), along with states 272B and 273B of pages 262 and 263 on memory device 130B respectively may all be set to the transferred state, as indicated by the dashed border on the respective pages. In an example, states 270B and 271C may be in the absent state indicating that respective pages 260 on memory device 130B and 261 on memory device 130C with dotted borders have never been received in respective memory devices 130B and 130C. In an example, states 271B, 270C, 272C, and 273C may be in the active state indicating that their respective pages with solid borders are the current active copies of such pages. In an example, page 261 may have been provisionally transferred from memory device 130B to memory device 130C during a pre-copy phase of migrating VM 212B from host node 110B to VM 212C on host node 110C. In the example, state 271C may have been set to another state (e.g., a pre-copy state) during the pre-copy phase. In an example, when VM 212C is launched on host node 110C, each page in the pre-copy state may be verified to be the current copy of the page before each transferred page's respective state on host node 110B is set to the transferred state and each transferred page's respective state on host node 110C is set to the active state. In an example, page 261 may be aggressively transferred to host node 110C without being requested to allow hypervisor 180B and/or host node 110B to be removed from multicast group 250. For example, during periods of low system usage, aggressively transferring memory pages may clean up the system to allow for lower latency during high usage periods. By eliminating host node 110B from the chain of custody for VM 212C, host node 110B may save any resources that would otherwise be consumed checking any page requests from VM 212C in the future, and VM 212C may immediately access page 261 when required. In an example, each memory page associated with a VM may have a state saved in each of the VM's previous hosts and/or isolated guest managers until every page is migrated off of that host and the host is removed from the multicast group.

In an example, prior to responding to any requests for pages from hypervisor 180C, system 201 would have started with each page (e.g., pages 260-263) stored in the same location as shown in system 200. In an example illustrated in system 200, page 260 on memory device 130A, pages 261-262 on memory device 130B, and page 263 on memory device 130C are depicted with solid lines indicating that respective states 270A, 271B, 272B, and 273C would be in the active state. In the example, pages 261-263 on memory device 130A and page 263 on memory device 130B are depicted with dashed lines indicating that respective states 270A, 271A, 272A, and 273B would be in the transferred state. In the example, page 260 on memory device 130B, and pages 260-262 on memory device 130C are depicted with dotted lines indicating that respective states 270B, 270C, 271C, and 272C would be in the absent state. In an example, system 201 depicts VM 212C executing on host node 110C requesting pages 260 and 262 to be transferred to memory device 130C. In an example, the lines around each page in system 201 reflect the states after this transfer. In the example, pages 260-263 on memory device 130A and pages 262 and 263 on memory device 130B are shown with dotted lines indicating that states 270A, 271A, 272A-B, and 273A-B are in the transferred state. In the example, page 260 on memory device 130B, and page 261 on memory device 130C are depicted with dotted lines indicating that states 270B and 271C are in the absent state. In the example, page 261 on memory device 130B and pages 260, 262, and 263 on memory device 130C are depicted with solid lines indicating that states 271B, 270C, 272C, and 273C are in the active state.

Figure 3:
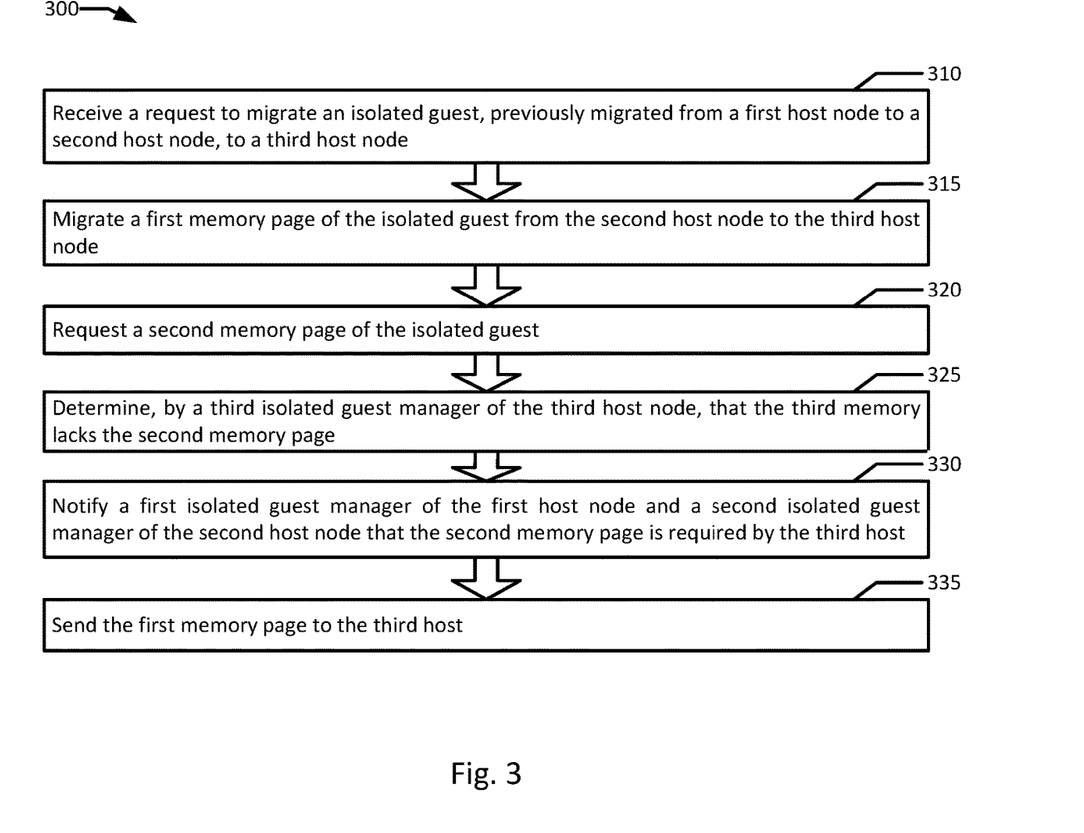
FIG. 3 is a flowchart illustrating an example of multi-target post-copy guest migration according to an example of the present disclosure.

FIG. 3 is a flowchart illustrating an example of multi-target post-copy guest migration according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by hypervisors 180B-C in conjunction with hypervisor 180A and VM 212C.

Example method 300 may begin by receiving a request to migrate an isolated guest, previously migrated from a first host node to a second host node, to a third host node (block 310). In an example, hypervisor 180B may receive a request from scheduler 140 to migrate VM 212B on host node 110B, which previously executed as VM 212A on host node 110A, to host node 110C. In the example, host node 110A is associated with memory device 130A and hypervisor 180A, host node 110B is associated with memory device 130B and hypervisor 180B, and host node 110C is associated with memory device 130C and hypervisor 180C.

A first memory page of the isolated guest is migrated from the second host node to the third host node (block 315). In an example, the isolated guest begins execution on the third host node after the third memory page is migrated. For example, page 263 of VM 212B is migrated from host node 110B to host node 110C, and VM 212C begins executing on host node 110C after page 263 is successfully migrated. In an example the second memory page is requested (block 320). For example, VM 212C executing on host node 110C may request page 260. In an example, a page fault occurs when VM 212C requests page 260. The third isolated guest manager determines that the third memory lacks the second memory page (block 325). For example, hypervisor 180C may determine that memory device 130C lacks page 260. In an example, hypervisor 180C's determination may be based on state 270C.

The first isolated guest manager and the second isolated guest manager are notified that the second memory page is required by the third host (block 330). In an example, in response to determining that memory device 130C lacks page 260 (e.g., page 260 has not yet been received), hypervisor 180C notifies hypervisors 180A-B that page 260 is required by host node 110C. In an example, a shared communication channel is associated with VM 212C, and the shared communication channel simultaneously notifies hypervisors 180A-B that page 260 is required by host node 110C. In an example, the shared communication channel may include a contact list of network addresses of host nodes 110A-B which have hosted previous copies of VM 212C (e.g., VMs 212A-B), for example stored in each of hypervisors 180A-C. In an example, multicast group 250 includes hypervisors 180A-B and multicast group 250 communicates via the shared communication channel, such that hypervisor 180C notifies multicast group 250 that page 260 is required by host node 110C. In an example multicast group 250 may be implemented on the data link layer (e.g., layer 2) of the open systems interconnection ("OSI") model, for example, via Ethernet multicast. In another example, multicast group 250 may be implemented in the internet layer (e.g., layer 3) of the OSI model, for example, as a user datagram protocol ("UDP") or internet protocol ("IP") multicast address. In an example, each member of multicast group 250 (e.g., hypervisors 180A-C) receives each message sent to multicast group 250. In an example, scheduler 140 may manage a membership of the multicast group 250. In an example, timeout protocols and retransmission protocols may be included to prevent lost data (e.g., from dropped packets) during the network transmission of a memory page.

In an example, page 260 is set to a transferred state, an active state, or an absent state by hypervisor 180A. In the example, state 270A associated with page 260 on memory device 130A is set to the transferred state while hypervisor 180A is transmitting page 260. In an example, setting the state at the start of or during transmission avoids the possibility of both the source and destination being in the active state in case a nearly immediate second request for page 260 is sent to multicast group 250. In another example, state 270 is set to the transferred state after the first isolated guest manager receives an acknowledgment that the first memory page is received. In an example, hypervisor 180A receives a request for page 262 and either ignores the request or responds that page 262 has been transferred based on state 272A set to the transferred state. In an example, the hypervisor 180B also receives the request for page 262 and responds to the request by sending page 262 to host node 110C and setting state 272B of the transferred state. In an example, state 270B is set to the absent state and state 272B is set to the transferred state by hypervisor 180B.

The second memory page is sent to the third host (block 335). In an example, hypervisor 180A sends page 260 to host node 110C. In an example, hypervisor 180A requests removal from multicast group 250 after states 270A, 271A, 272A and 273A associated with each memory page of VM 212A (e.g., pages 260-263 on memory device 130A) is set to the transferred state. In an example, hypervisor 180B additionally requests removal from multicast group 250 after states 270B, 271B, 272B and 273B associated with each memory page of VM 212B (e.g., pages 260-263 on memory device 130B) is set to a state other than the active state (e.g., transferred state, absent state).

Figure 4:
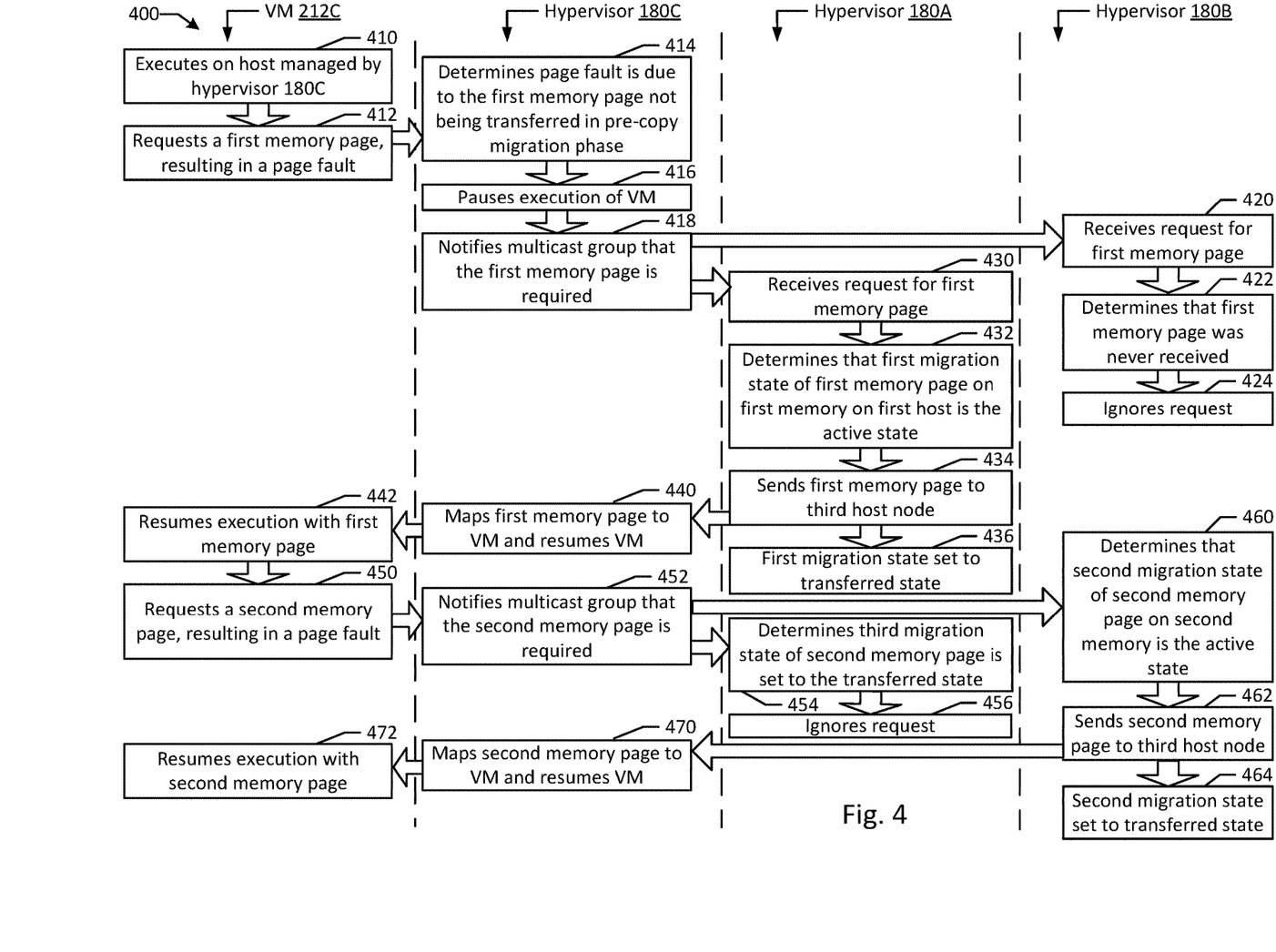
FIG. 4 is flow diagram of an example of multi-target post-copy guest migration according to an example of the present disclosure.

FIG. 4 is flow diagram of an example of multi-target post-copy guest migration according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, hypervisors 180A-C cooperate to migrate VM 212C between hosts 110A-C.

In example system 400, VM 212C may be the same VM as VMs 212A and 212B, after being migrated from host node 110A to host node 110B and finally to host node 110C. In an example, VM 212C executes on host node 110C managed by hypervisor 180C (block 410). In the example, VM 212C may request page 260 resulting in a page fault (block 412). In an example, hypervisor 180C determines that the page fault is due to page 260 not having been migrated to memory device 130C during a pre-copy migration phase of VM 212B (block 414). In an example, hypervisor 180C pauses execution of VM 212C to correct the page fault (block 416). In the example, hypervisor 180C notifies multicast group 250 that page 260 is required on host 110C (block 418).

In an example, hypervisor 180B receives the request for page 260 (block 420). In the example, hypervisor 180B determines that page 260 was never received when VM 212A was migrated to host node 110B to become VM 212B (block 422). For example, state 270B may be determined to be set to the absent state. In an example, hypervisor 180B ignores the request (block 424). In an example, hypervisor 180A receives the request simultaneously with hypervisor 180B, for example, due to both hypervisors 180A-B being members of multicast group 250. In the example, hypervisor 180A determines that state 270A of page 260 on memory device 130A is set to the active state (block 432). Then, hypervisor 180A sends page 260 to host node 110C (block 434). Hypervisor 180A may then set state 270A to the transferred state (block 436). In an example, host node 110C receives page 260, then hypervisor 180C maps page 260 to VM 212C and resumes VM 212C (block 440). Then, VM 212C resumes execution with page 260 (block 442).

After resuming execution with page 260, VM 212C may then request page 262 resulting in a second page fault (block 450). In an example, hypervisor 180C notifies multicast group 250 that page 262 is required (block 452). In an example, hypervisor 180A determines that state 272A of page 262 is set to the transferred state (block 454). In the example, hypervisor 180A ignores the request for page 262 based on state 272A being in the transferred state (block 456). In an example, hypervisor 180B determines that state 272B of page 262 on memory device 130B is set to the active state (block 460). In the example, hypervisor 180B then sends page 262 to host node 110C (block 462). In the example, hypervisor 180B also sets state 272B to the transferred state (block 464). Upon host node 110C receiving page 262, hypervisor 180C may then map page 262 to VM 212C and resume execution of VM 212C (block 470). Then, VM 212C resumes execution with page 262 (block 472).

In an example, scheduler 140 may request VM 212C to be migrated back to host node 110A. In the example, after VM 212C resumes execution again on host node 110A as an updated copy of VM 212A. In an example, page 260 may have never been requested and may still be in the active state in memory device 130A, but may be assigned still to the previous copy of VM 212A by hypervisor 180A. In the example, page 260 is requested by the new VM 212A resulting in a page fault. In the example, hypervisor 180A may send a request for page 260 to the multicast group 250 and identify that page 260 is present in memory device 130A but assigned to the former VM 212A. In the example, page 260 may be reassigned to the newly migrated copy of VM 212A on host node 110A via a zero-copy pointer change. In an example, a zero-copy operation is one where data is not read into a processor and copied from one memory location to another. In an example, the data stays in place and a reference to the data such as a pointer is added and/or modified to change re-assign the data, for example, from old VM 212A to new VM 212A. In an example, the pointer switch may be done purely based on page 260 being in the active state without any processor evaluating the contents of page 260. In another example, multicast group 250 may be notified of VM 212C's migration back to host node 110A and hypervisor 180A may migrate all of the pages of the old VM 212A still set to the active state in memory device 130A to the newly migrated copy of VM 212A as part of a pre-copy migration phase of the VM, for example, via zero-copy pointer changes.

Figure 5:
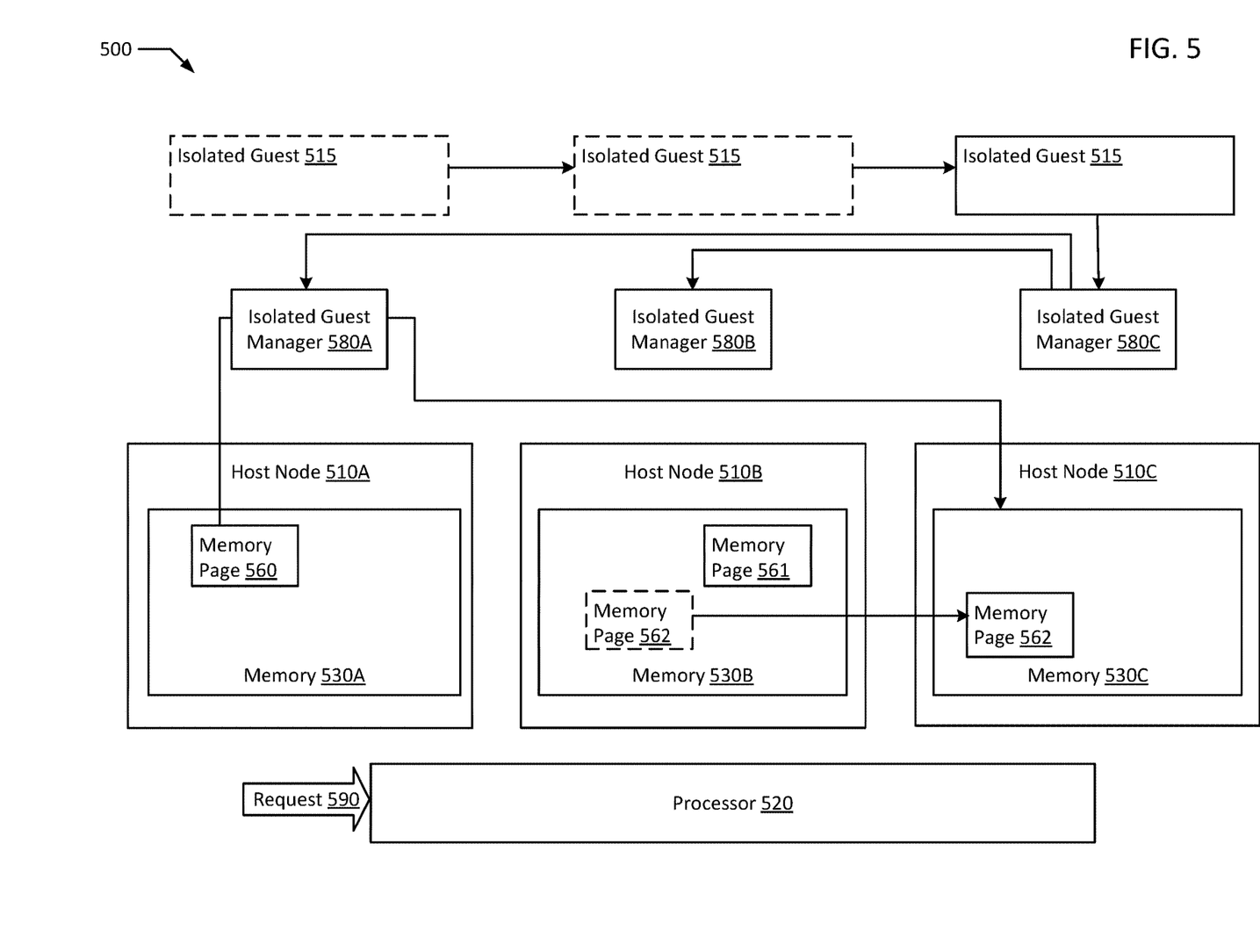
FIG. 5 is a block diagram of an example system for multi-target post-copy guest migration according to an example of the present disclosure.

FIG. 5 is a block diagram of an example system for multi-target post-copy guest migration according to an example of the present disclosure. Example system 500 includes host nodes 510A-C associated with memories 530A-C including host node 510A associated with memory 530A, host node 510B associated with memory 530B, and host node 510C associated with memory 530C. Host node 510A is additionally associated with isolated guest manager 580A, host node 510B is additionally associated with isolated guest manager 580B, and host node 510C is additionally associated with isolated guest manager 580C. Isolated guest 515 executes on host node 510B and includes memory page 560 in memory 530A and memory pages 561-562 in memory 530B, isolated guest 515 having previously been migrated from host node 510A to host node 510B. Processor 520 receive request 590 to migrate isolated guest 515 to host 510C. Memory page 562 is migrated to host 510C, where isolated guest 515 begins execution on host 510C after memory page 562 is migrated. Isolated guest 515 requests memory page 560. Isolated guest manager 580C determines that memory 530C lacks memory page 560. In response to determining that memory 530C lacks memory page 560, isolated guest manager 580A and isolated guest manager 580B are notified that memory page 560 is required by host 510C. Isolated guest manager 580A sends memory page 560 to host 510C.

In an example, multi-target post-copy guest migration provides significant latency advantages for multiple migrations of the same isolated guest as compared to typical chain-migration systems, at the cost of minimal additional memory overhead, with potentially significant bandwidth savings as well. For example, by removing what is effectively a daisy chain of custody of each migrated guest, hosts that have completed migration may be removed entirely from the multicast group associated with the guest. Therefore, if a guest is quickly moved from a second host to a third host, before the second host has received many memory pages, in a daisy-chain embodiment, the third host would typically query the second host for each memory page the third host requires. However, with multi-target post-copy guest migration, the second host may aggressively transfer all of the pages it did receive and drop out of the group, effectively allowing the third host to go straight to the first host cutting out the middleman, and typically at least 10 ms on each request due to latency reductions from reducing network hops. This advantage is increased the more intermediary hosts the guest has been migrated to. These efficiencies are on top of the pure latency savings achieved by multicasting requests rather than waiting for requests to be passed up a chain until the current holder of a given memory page is found. The additional cost may typically only be storing one or two bits of Boolean information per memory page on each host to track transmission state of each page. As compared to typical memory page sizes of at least four kilobytes (e.g., 32,000 bits), the additional cost of flagging transmission state may typically be unnoticeably small.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a plurality of host nodes associated with a plurality of memories including a first host node associated with a first memory, a second host node associated with a second memory, and a third host node associated with a third memory;
a plurality of isolated guest managers including a first isolated guest manager associated with the first host node, a second isolated guest manager associated with the second host node, and a third isolated guest manager associated with the third host node;
an isolated guest executing on the second host node, wherein the isolated guest includes at least a first memory page in the first memory, a second memory page in the second memory, and a third memory page in the second memory, and the isolated guest was previously migrated from the first host node to the second host node; and
one or more processors executing to:
receive a request to migrate the isolated guest to the third host node;
migrate the third memory page to the third host node, wherein the isolated guest begins execution on the third host node after the third memory page is migrated;
request, by the isolated guest, the first memory page;
determine, by the third isolated guest manager, that the third memory lacks the first memory page;
responsive to determining that the third memory lacks the first memory page, notify the first isolated guest manager and the second isolated guest manager that the first memory page is required by the third host node; and
send, by the first isolated guest manager, the first memory page to the third host node.

2. The system of claim 1, wherein a shared communication channel associated with the isolated guest simultaneously notifies each isolated guest manager of the plurality of isolated guest managers that the first memory page is required by the third host node.

3. The system of claim 2, further comprising:
a multicast group that includes, the first isolated guest manager and the second isolated guest manager, wherein the multicast group communicates via the shared communication channel, and the third isolated guest manager notifies the multicast group that the first memory page is required by the third host node.

4. The system of claim 1, wherein the first memory page is set to a first migration state by the first isolated guest manager, and the first migration state is at least a one of a transferred state, an active state, and an absent state.

5. The system of claim 4, wherein the first migration state is set to the transferred state while the first isolated guest manager is transmitting the first memory page.

6. The system of claim 4, wherein the first migration state is set to the transferred state after the first isolated guest manager receives an acknowledgment that the first memory page is received.

7. The system of claim 5, wherein the first isolated guest manager receives a request for the second memory page and one of (i) ignores the request and (ii) responds that the second memory page has been transferred based on a second migration state of the second memory page being set to the transferred state.

8. The system of claim 7, wherein the second isolated guest manager also receives the request for the second memory page and responds to the request by sending the second memory page to the third host node and setting a third migration state of the second memory page to the transferred state.

9. The system of claim 8, wherein a fourth migration state of the first memory page is set to the absent state by the second isolated guest manager and a fifth migration state of the third memory page is set to the transferred state by the second isolated guest manager.

10. The system of claim 9, wherein the second isolated guest manager requests removal from the multicast group after a respective migration state of each memory page of the isolated guest is set to one of the transferred state and the absent state by the second isolated guest manager.

11. The system of claim 1, wherein a page fault occurs when the isolated guest requests the first memory page while executing on the third host node.

12. The system of claim 1, wherein the second memory page is migrated to the third host node before the isolated guest requests the second memory page.

13. The system of claim 1, wherein a fourth memory page of the isolated guest is stored in the first memory, and the isolated guest is migrated back to the first host node from the third host node.

14. The system of claim 13, wherein the fourth memory page is reassigned to the isolated guest via a zero-copy pointer change.

15. The system of claim 1, wherein an isolated guest scheduler manages the migration of the isolated guest between the second host node and the third host node.

16. The system of claim 15, wherein the isolated guest scheduler manages a membership of the multicast group.

17. A method comprising:
receiving a request to migrate an isolated guest, previously migrated from a first host node to a second host node, to a third host node, wherein the first host node is associated with a first isolated guest manager and a first memory including a first memory page, the second host node is associated with a second isolated guest manager and a second memory including a second memory page and a third memory page, and the third host node is associated with a third isolated guest manager and a third memory;
migrating the third memory page of the isolated guest from the second host node to the third host node, wherein the isolated guest begins execution on the third host node after the third memory page is migrated;
requesting, by the isolated guest, the first memory page;
determining, by the third isolated guest manager, that the third memory lacks the first memory page;
responsive to determining that the third memory lacks the first memory page, notifying the first isolated guest manager and the second isolated guest manager that the first memory page is required by the third host node; and
sending, by the first isolated guest manager, the first memory page to the third host node.

18. The method of claim 17, wherein the third host node is added to a multicast group associated with the isolated guest, the multicast group including the first host node and the second host node, and the first isolated guest manager and the second isolated guest manager are notified simultaneously that the first memory page is required by the third host node based on the third isolated guest manager notifying the multicast group.

19. The method of claim 17, wherein the first memory page is set to a first migration state by the first isolated guest manager, and the first migration state is at least a one of a transferred state, an active state, and an absent state.

20. A computer-readable non-transitory storage medium comprising executable instructions that, when executed by a computer system, cause the computer system to:
receive a request to migrate an isolated guest, previously migrated from a first host node to a second host node, to a third host node, wherein the first host node is associated with a first isolated guest manager and a first memory including a first memory page, the second host node is associated with a second isolated guest manager and a second memory including a second memory page and a third memory page, and the third host node is associated with a third isolated guest manager and a third memory;
migrate the third memory page of the isolated guest from the second host node to the third host node, wherein the isolated guest begins execution on the third host node after the third memory page is migrated;
request, by the isolated guest, the first memory page;
determine, by the third isolated guest manager, that the third memory lacks the first memory page;
responsive to determining that the third memory lacks the first memory page, notify the first isolated guest manager and the second isolated guest manager that the first memory page is required by the third host node; and
send, by the first isolated guest manager, the first memory page to the third host node.

* * * * *